United States Patent
Lu et al.

(10) Patent No.: US 11,216,113 B2
(45) Date of Patent: Jan. 4, 2022

(54) TOUCH CIRCUIT

(71) Applicant: SITRONIX TECHNOLOGY CORP., Jhubei (TW)

(72) Inventors: Chi Huan Lu, Jhubei (TW); Chun Kuan Wu, Jhubei (TW); Ching-Jen Tung, Jhubei (TW); Hung-Yen Tai, Jhubei (TW)

(73) Assignee: Sitronix Technology Corp., Jhubei (TW)

( * ) Notice: Subject to any disclaimer, the term of this patent is extended or adjusted under 35 U.S.C. 154(b) by 0 days.

(21) Appl. No.: 16/149,448

(22) Filed: Oct. 2, 2018

(65) Prior Publication Data

US 2019/0102040 A1    Apr. 4, 2019

Related U.S. Application Data (60) Provisional application No. 62/566,683, filed on Oct. 2, 2017.

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/0416* (2013.01)

(58) Field of Classification Search
CPC ............................. G06F 3/0416; G06F 3/044
See application file for complete search history.

(56) References Cited

U.S. PATENT DOCUMENTS

| | | | |
|---|---|---|---|
| 2012/0268414 A1* | 10/2012 | Alameh | G06F 3/03545 345/174 |
| 2013/0106779 A1 | 5/2013 | Company Bosch et al. | |
| 2016/0282991 A1* | 9/2016 | Wu | G06F 3/0416 |

FOREIGN PATENT DOCUMENTS

| | | |
|---|---|---|
| CN | 101833406 A | 9/2010 |
| CN | 102239461 A | 11/2011 |
| CN | 104156096 A | 11/2014 |
| CN | 105278776 A | 1/2016 |
| CN | 106155435 A | 11/2016 |
| KR | 20110061637 A | 6/2011 |
| KR | 20130076220 A | 7/2013 |
| KR | 20160006982 A | 1/2016 |
| TW | 201635126 A | 10/2016 |

OTHER PUBLICATIONS

KIPO Notice of Preliminary Rejection dated Apr. 16, 2020 for corresponding KR Application No. 10-2018-0117859.
Chinese Patent Office Official Action dated Jul. 14, 2021 for corresponding CN Application No. 2018111684258.

* cited by examiner

*Primary Examiner* — Aneeta Yodichkas
(74) *Attorney, Agent, or Firm* — Rosenberg, Klein & Lee (57) ABSTRACT

The present invention provides a touch circuit, which comprises a detection circuit and an emulation circuit. The detection circuit detects a detection signal; the emulation circuit includes a reference load and receives a signal. The emulation circuit generates an emulation signal according to the reference load and the signal. The touch circuit outputs a touch signal according to the detection signal and the emulation signal.

11 Claims, 9 Drawing Sheets

Figure 9

TOUCH CIRCUIT

FIELD OF THE INVENTION

The present invention relates generally to a driving circuit, and particularly to a touch circuit.

BACKGROUND OF THE INVENTION

There are two design types for projective capacitive panels, including self-capacitance and mutual-capacitance panels. On the surface of a glass, a horizontal driving electrode array and a vertical sensing electrode array are manufactured using a transparent conductive material (indium tin oxide, ITO). The driving electrodes and the sensing electrodes form capacitances, respectively, which are just the so-called self-capacitances and represent the capacitances between the electrodes and the ground. When a finger touches the touch panel, the capacitance of the finger will be superposed to the self-capacitances and hence increasing the capacitance. In a touch test for a self-capacitance panel, the driving electrode array and the sensing electrode array are tested individually. According to the change in capacitance before and after touch, the horizontal coordinate and the vertical coordinate are determined, respectively, and then combined to give the touch coordinates on a plane. The scanning method for a self-capacitance panel is equivalently to project the touch point to the x- and y-axis directions, respectively, and then calculate the coordinates along the x- and y-axis directions, respectively. Finally, the coordinates are combined to form the coordinates of the touch point.

For a mutual-capacitance panel, driving electrodes and sensing electrodes are fabricated on glass surface using ITO. The difference between a mutual-capacitance panel and a self-capacitance one is that the mutual capacitances will form at the intersections of two electrodes, meaning that the two electrodes forms the two terminals of a mutual capacitance. As a finger touches the touch panel, the coupling between the two electrodes near the touch point will be influenced and thereby changing the capacitance therebetween. While testing the value of mutual capacitance, the horizontal driving electrodes transmit a driving signal sequentially and all the vertical sensing electrodes receive the signals concurrently. Thereby, the capacitance values at all the intersections of horizontal and vertical electrodes, namely, the capacitances of the two-dimensional plane of the whole touch panel, can be given. According to the variation of the two-dimensional capacitances of the touch panel, the coordinates of each touch point can be calculated. Accordingly, even there might be multiple touch point on the panel, the real coordinates of each touch point still can be calculated.

Figure 1:
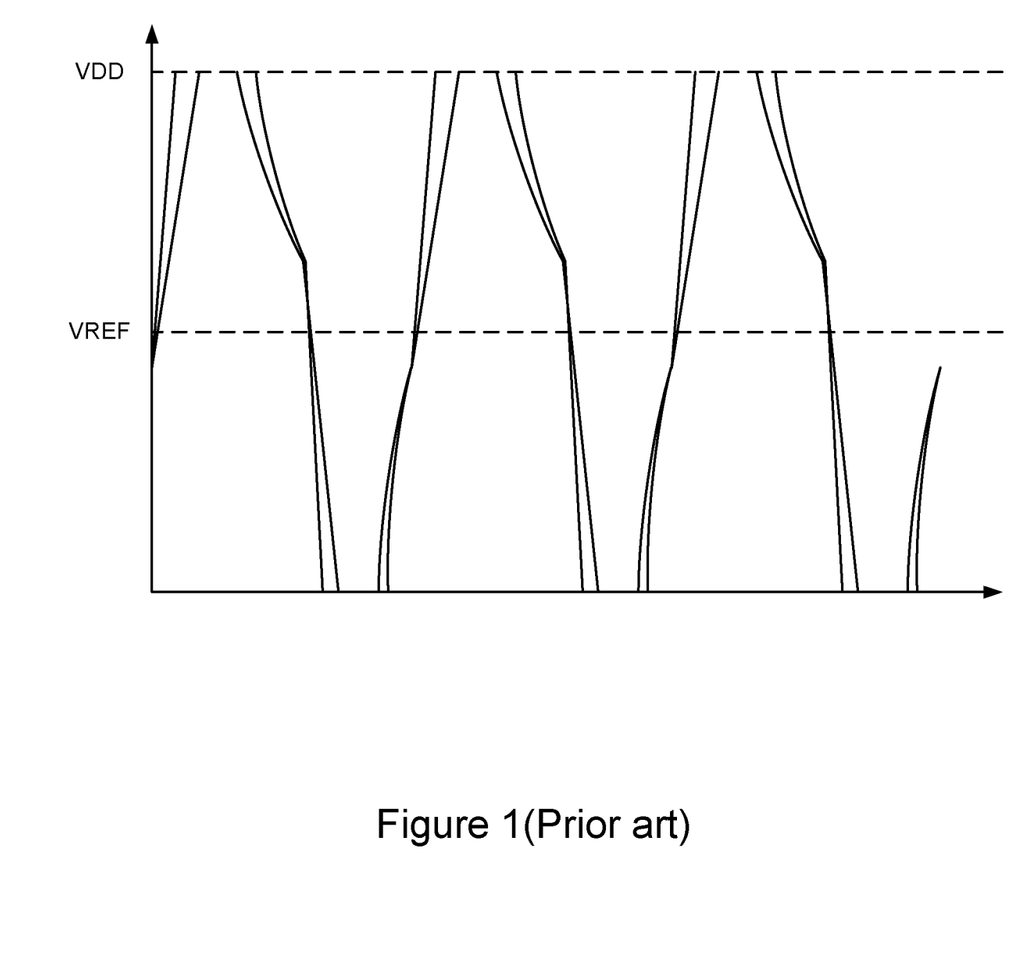
FIG. 1 shows waveforms of sensing signals according to the prior art.

Unfortunately, in comparison with the self capacitance and the mutual capacitance, the capacitance of a finger is small, leading to smaller level variation for the sensing signal. Thereby, the touch point of a finger cannot be judged accurately. In general, to judge the variation of sensing signals easily, the sensing signals before and after touch are amplified for making the variation more obvious. Nonetheless, it usually occurs that the amplified sensing signals exceed the operating range of voltage. FIG. 1 shows waveforms of sensing signals according to the prior art. The sensing signal before and after touch have exceeded the voltage VDD after amplification.

Accordingly, the present invention provides a touch circuit for broadening the amplification range for signals.

SUMMARY

An objective of the present invention is to provide a touch circuit for broadening the range for signal amplification.

The present invention discloses a touch circuit, which comprises a detection circuit and an emulation circuit. The detection circuit detects a detection signal; the emulation circuit includes a reference load and receives a signal. The emulation circuit generates an emulation signal according to the reference load and the signal. The touch circuit outputs a touch signal according to the detection signal and the emulation signal.

The emulation circuit includes a transmission device, which is coupled to the reference load and transmits the signal to the reference load. The reference load corresponds to the load of a touch panel.

The detection circuit includes an operational circuit. The operational circuit is coupled to a touch panel and the emulation circuit and receives and operates the detection signal and the emulation signal to generate an operational signal. Alternatively, the operational circuit is coupled to the emulation circuit, and receives and operates the emulation signal and a reference signal to generate the operational signal. Alternatively, the operational circuit is coupled to a touch panel via an impedance device and to the emulation circuit for receiving the emulation signal. The operational circuit generates an operational signal according to the detection signal and the emulation signal.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 2:
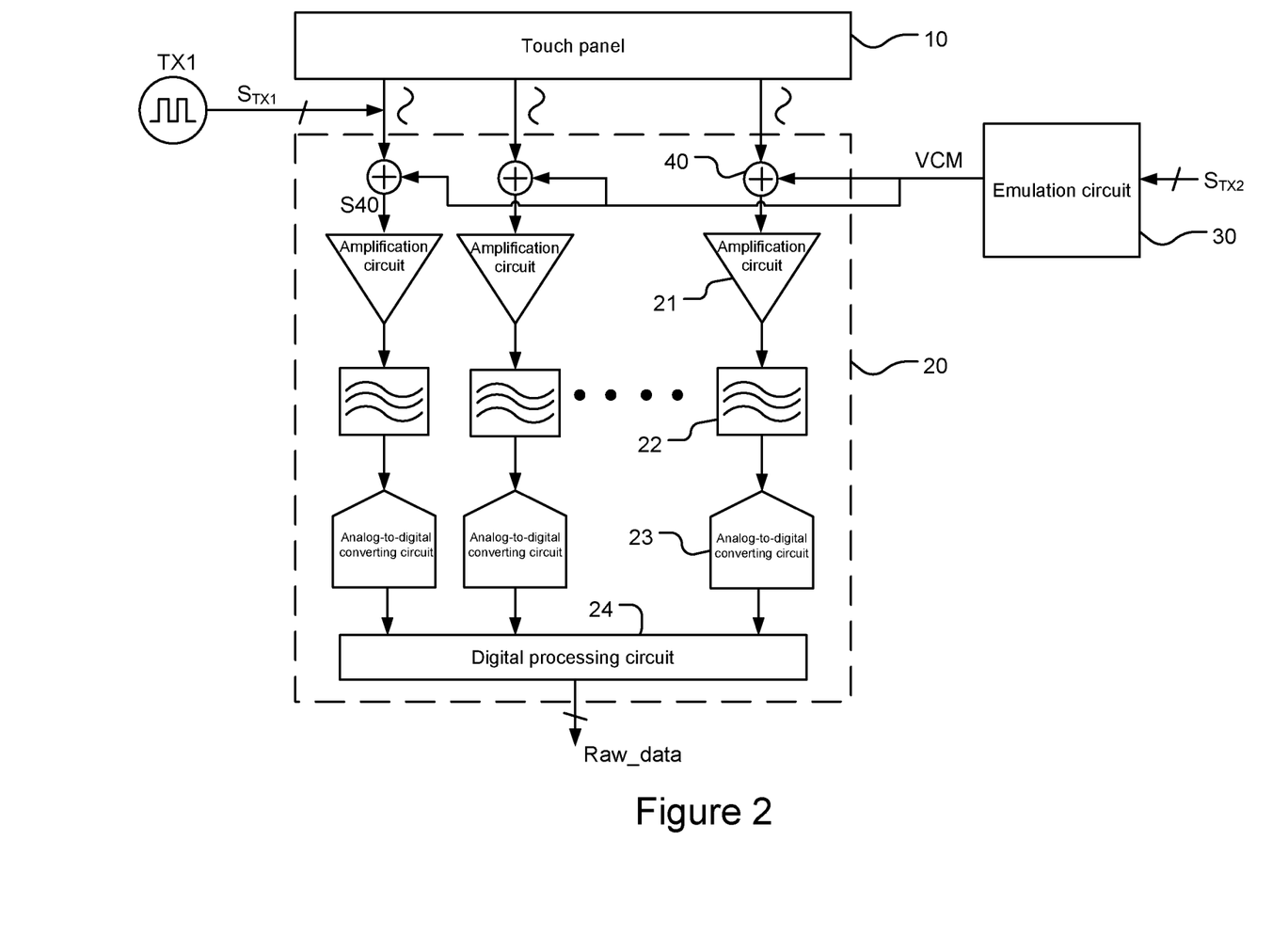
FIG. 2 shows a schematic diagram of the touch device according to a first embodiment of the present invention.

Please refer to FIG. 2, which shows a schematic diagram of the touch device according to a first embodiment of the present invention. As shown in the figure, the touch device comprises a touch panel 10 and a touch circuit. The touch circuit comprises a detection circuit 20 and an emulation circuit 30. The touch circuit can further comprise a signal source TX1 coupled at a circuit node between the touch panel 10 and the detection circuit 20. The signal source TX1 generates a signal STX1, which is used for detecting the touch of a finger. Thereby, the signal STX1 can be called a s touch driving signal. The signal source TX1 can be replaced by a driving circuit. Thereby, the present invention is not limited to the naming of the components and signals. The touch panel 10 includes a touch sensing region, which includes a plurality of driving electrodes and a plurality of sensing electrodes. The signal STX1 is transmitted to a driving electrode or a sensing electrode inside the touch panel 10 through the circuit node. The detection circuit 20 detects the variation of the signals on the driving electrode and the sensing electrode for detecting the touch location of the finger. In addition, the signal source TX1 and the detection circuit 20 can be integrated into a circuit. This circuit outputs the signal STX1 and detects a detection signal, which is just the signal VIN in FIG. 3.

The detection circuit 20 includes an amplification circuit 21, a filtering circuit 22, an analog-to-digital converting circuit 23, and a digital processing circuit 24. The digital processing circuit 24 is coupled to the analog-to-digital converting circuit 23 and generates a touch signal Raw_data according to a digital signal output by the analog-to-digital converting circuit 23. The analog-to-digital converting circuit 23 is coupled to the filtering circuit 22 and generates the digital signal according to a filtering signal output by the filtering circuit 22. The filtering circuit 22 is coupled to the amplification circuit 21 and generates the filtering signal according to an amplification signal S21 output by the amplification circuit 21. The detection circuit 20 can further includes an operational circuit 40, which is coupled to the amplification circuit 21 for outputting an operational signal S40 to the amplification circuit 21. Thereby, the amplification circuit 21 generates the amplification signal S21 according to the operational signal S40. Besides, the operational circuit 40 is coupled to the sensing electrodes of the touch panel 10 for receiving the detection signal and generates the operational signal S40 according to the detection signal.

According to the embodiment in FIG. 2, the operational circuit 40 is disposed in the detection circuit 20. Alternatively, the operational circuit 40 can be disposed outside the detection circuit 20, just like the emulation circuit 30. In other words, the operational circuit 40 can also be disposed inside the emulation circuit 30. Alternatively, both the operational circuit 40 and the emulation circuit 30 are disposed inside the detection circuit 20. The various locations of the operational circuit 40 and the emulation circuit 30 will not influence the embodiment of the present invention. In addition, the operational circuit 40 can be an adder or a subtractor.

Please refer again to FIG. 2. The emulation circuit 30 and the touch panel 10 receive a signal STX2 and the signal STX1, respectively. The signals STX2, STX1 can be identical or different signals. In addition, these two signals can be generated by the same signal source or different signal sources. The present invention is not limited to the choices. The emulation circuit 30 is coupled to the operational circuit 40 of the detection circuit 20, and output an emulation signal VCM to the operational circuit 40 according to the signal STX2. The operational circuit 40 generates the operational signal S40 according to the emulation signal VCM and the detection signal. Besides, the operational circuit 40 in FIG. 2 all receives the same emulation signal VCM. Alternatively, the emulation signal VCM can be changed according to the equivalent load of each electrode (the driving electrode or the sensing electrode) of the touch panel 10. That is to say, the emulation signal VCM can emulate the electrical states, for example, the voltage level, of the signal STX1 transmitted to different electrodes. In other words, each operational circuit 40 in FIG. 2 can also receive a different emulation signal VCM according to different equivalent load of electrodes. Thereby, the touch circuit cancels a part of the electrical states on the electrodes according to the emulation signal VCM, so that the gain of the amplification circuit 21 of the touch circuit can be increased. Moreover, the operational signal S40 amplified by the amplification circuit 21 still will not exceed the operating range of voltage.

Accordingly, the emulation signal VCM can completely or partially cancel the electrical state of the signal STX1 after being transmitted to the electrodes (the driving electrode or the sensing electrode of the touch panel 10). For example, after the signal STX1 is transmitted to an electrode, the initial voltage level of the electrode is 5V. The voltage level of the emulation signal VCM can the 5V as well. When the operational circuit 40 operates, the emulation signal VCM can completely cancel the initial voltage level of the electrode. Alternatively, after the signal STX1 is transmitted to an electrode, the voltage of the electrode is 5V while the voltage level of the emulation signal VCM can be 2.5V. When the operational circuit 40 operates, the emulation signal VCM only cancel a half of the initial voltage on the electrode. Thereby, the voltage levels of the emulation signal VCM and the signal STX2 can be adjusted according to the gain of the amplification circuit 21, the voltage level of the signal STX1, the initial voltage level of the electrode, or the operating range of voltage. Accordingly, the present invention does not limit the voltage level (nonzero) of the emulation signal VCM and the signal STX2. Different voltage levels of the emulation signal VCM and the signal STX2 facilitate different degrees of amplification range. It's up to circuit designers to determine the voltage levels.

Figure 3:
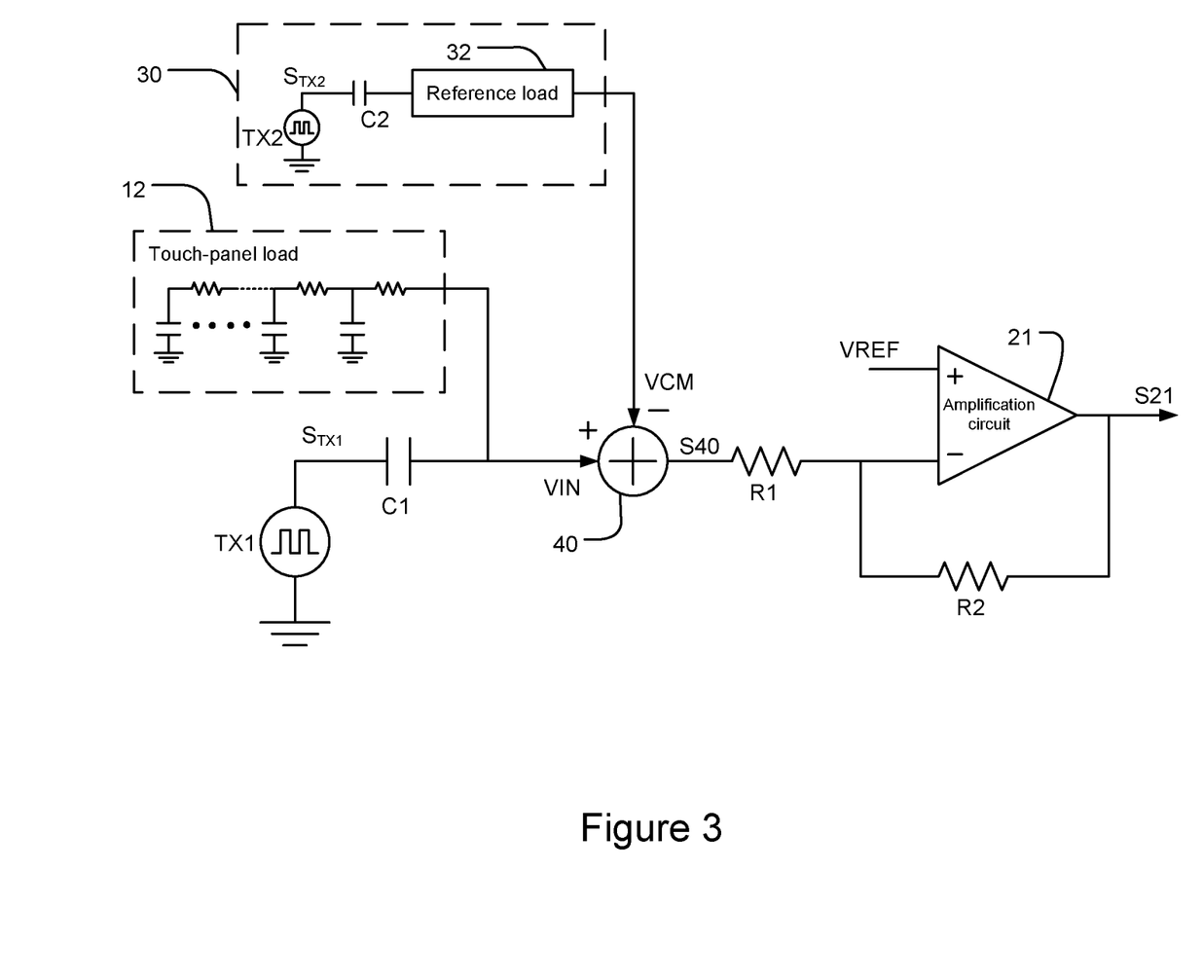
FIG. 3 shows a schematic diagram of the emulation circuit applied to the touch circuit according to a first embodiment of the present invention.

Please refer to FIG. 3, which shows a schematic diagram of the emulation circuit applied to the touch circuit according to a first embodiment of the present invention. As shown in the figure, all the electrodes, a driving electrode, or a sensing electrode in the touch panel 10 can be represented by a touch-panel load 12. The signal STX1 can be generated by the signal source TX1 and transmitted to the electrodes of the touch panel 10 by a transmission device. This transmission device can be a passive device such as a capacitor C1, an inductor, or a resistor. Alternatively, the transmission device can be the capacitor formed by a diode-connection of a transistor (active device). The present invention does not limit the types of the transmission device.

The emulation circuit 30 shown in FIG. 3 includes a reference load 32, which coupled to the transmission device (the capacitor C2). The transmission device transmits the signal STX2 to the reference load 32. Likewise, the reference load 32 can be the same as or different from the touch-panel load 12 Thereby, the reference load 32 corresponds to the touch-panel load 12. By adjusting the reference load 32, the voltage level of the emulation signal VCM can be changed. In addition, the emulation circuit 30 according to the embodiment in FIG. 3 can include a capacitor C2 and a signal source TX2. The signal source TX2 generates the signal STX2, which transmitted to the reference load 32 by the capacitor C2. The signal STX2 generated by the signal source TX2 can be the same as or different from the signal STX1 generated by the signal source TX1. The capacitance of the capacitor C2 is the same as or different from the capacitance of the capacitor C1. Thereby, the reference load 32, the capacitor C2, and the signal source TX2 emulates the touch-panel load 12, the capacitor C1, and the signal source TX1, respectively. Hence, the emulation signal VCM output by the emulation circuit 30 can emulate partial or all electrical states of the signal STX1 after being transmitted to the touch-panel load 12.

Please refer again to FIG. 3, the operational circuit 40 receives an input signal VIN. According to the embodiment of FIG. 3, the input signal VIN is the detection signal. Thereby, the operational circuit 40 operates the input signal VIN and the emulation signal VCM to generate the operational signal S40. Namely, while operating, the operational circuit 40 subtracts the emulation signal VCM from the input signal VIN to give the operational signal S40. Consequently, the operational circuit 40 according to the present embodiment is a subtractor. Besides, as described above, whether the emulation circuit 30, the operational circuit 40, the amplification circuit 21, the resistor R1, and the resistor R2 are located inside or outside the detection circuit 20, all are the embodiment of the present invention. According to the embodiment in the FIG. 3, the amplification circuit 21 is a current amplifier. The amplification circuit 21 is coupled to the operational circuit 40 via an impedance device (the resistor R1), receives a reference signal VREF, and generates the amplification signal S21 according to the operational signal S40 and the reference signal VREF.

Figure 4:
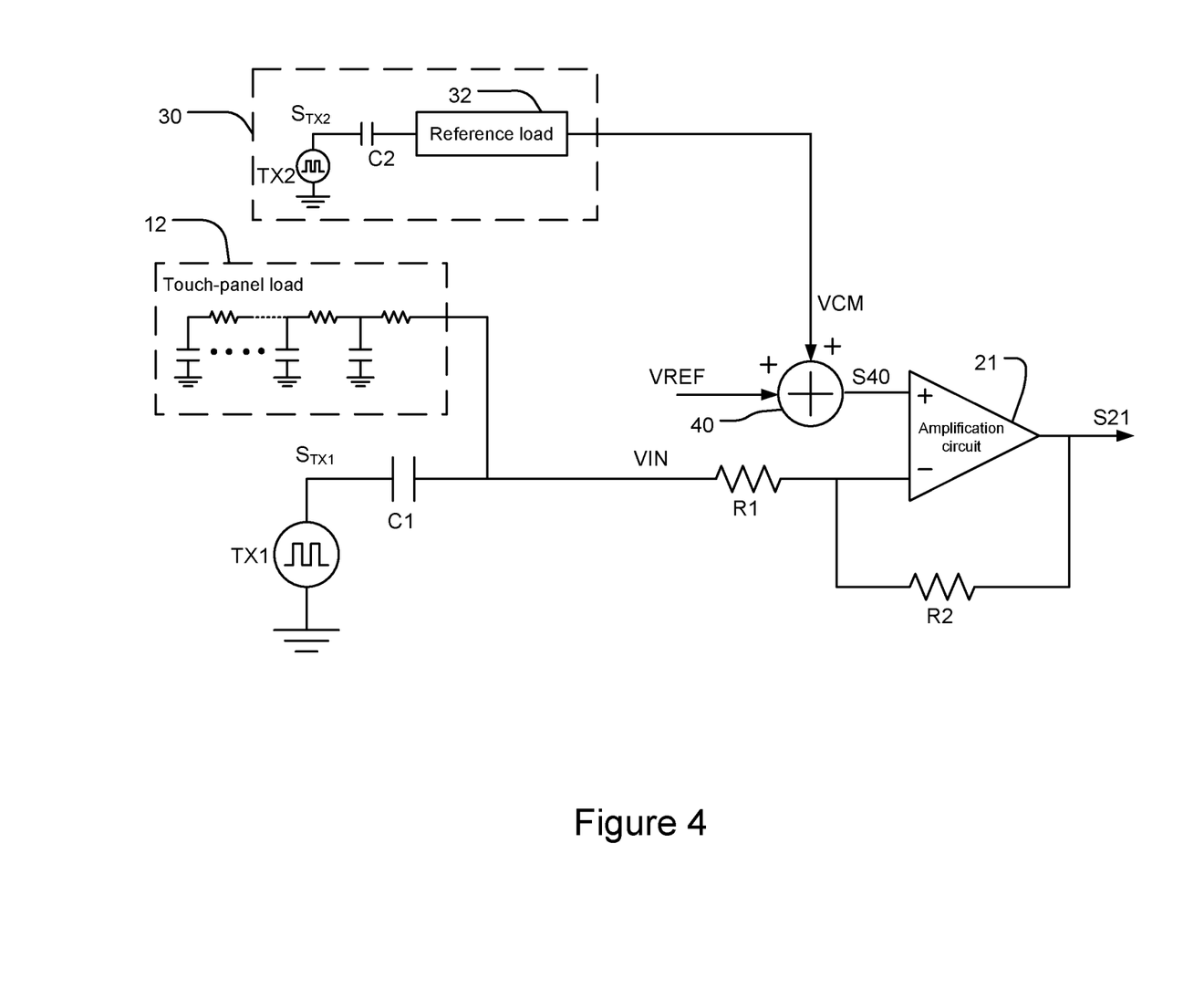
FIG. 4 shows a schematic diagram of the emulation circuit applied to the touch circuit according to a second embodiment of the present invention.

Please refer to FIG. 4, which shows a schematic diagram of the emulation circuit applied to the touch circuit according to a second embodiment of the present invention. As shown in the figure, the output of the emulation circuit 30 can be alternatively coupled to a positive terminal of the amplification circuit 21. In addition, the operational circuit 40 is disposed to the positive terminal of the amplification circuit 21. Thereby, while operation, the operational circuit 40 adds a reference signal VREF to the emulation signal VCM to generate the operational signal S40. The amplification circuit 21 only amplifies the voltage level of the input signal VIN subtracted by the operational signal S40. Hence, the voltage level of the amplification signal S21 will not exceed the operating range of voltage. Furthermore, the operational circuit 40 according to the embodiment in FIG. 4 can be alternatively replaced by a charging capacitor or a pull-up resistor for raising the voltage level of the positive terminal of the amplification circuit 21. Namely, the voltage level of the positive terminal of the amplification circuit 21 can be raised from the level of the reference signal VREF to the level of the sum of the reference signal VREF and the emulation signal VCM. Thereby, the amplification circuit 21 is coupled to the operational circuit 40 for receiving the operational signal S40 and generating the amplification signal S21 according to the operational signal S40 and the detection signal (the input signal VIN).

Figure 5:
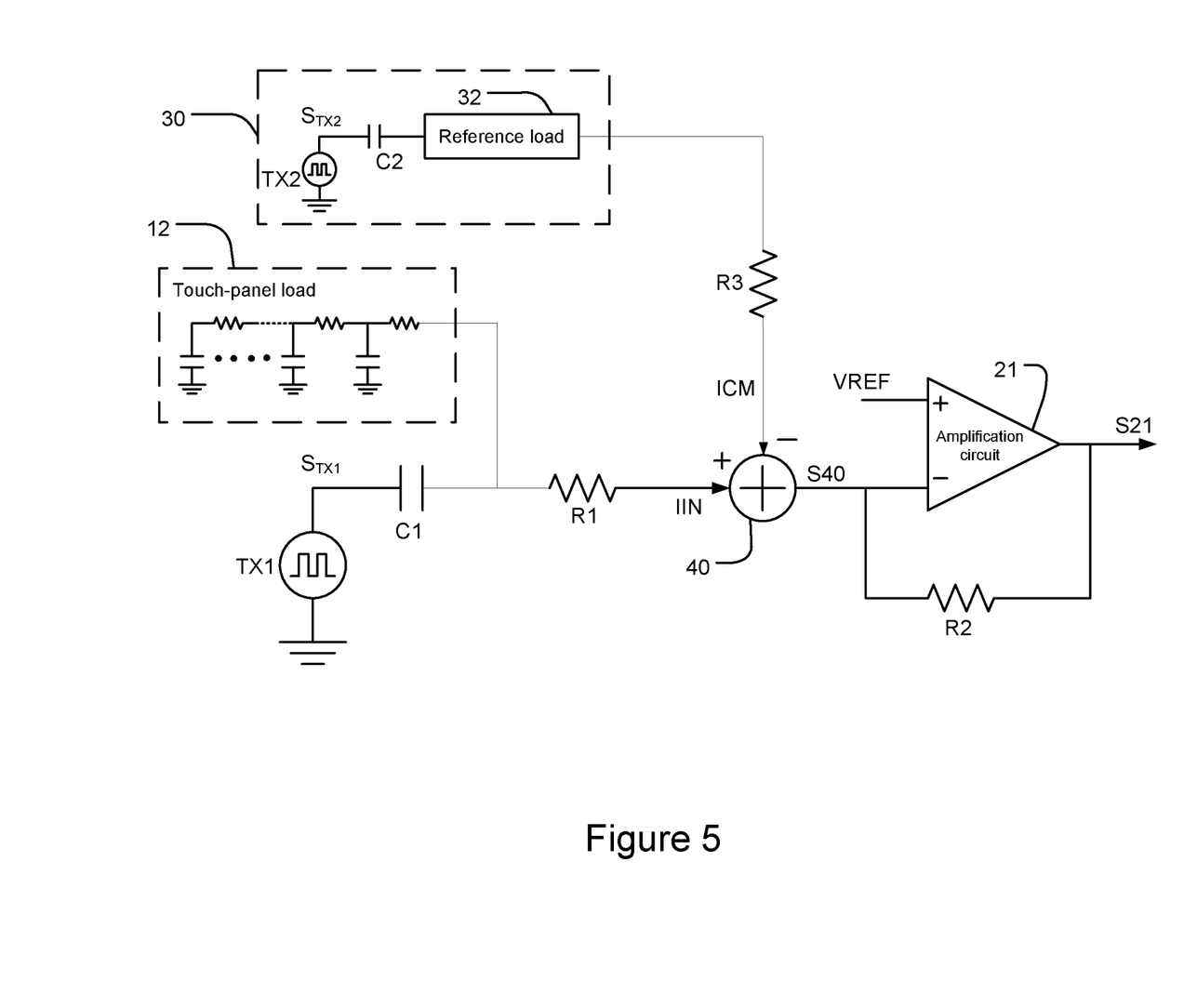
FIG. 5 shows a schematic diagram of the emulation circuit applied to the touch circuit according to a third embodiment of the present invention.

Please refer to FIG. 5, which shows a schematic diagram of the emulation circuit applied to the touch circuit according to a third embodiment of the present invention. As shown in the figure, the amplification circuit 21 is coupled to the operational circuit 40 for receiving the operational signal S40. Besides, the amplification circuit 21 is coupled to the reference signal VREF and generates the amplification signal S21 according to the operational signal S40 and the reference signal VREF. The emulation signal VCM output by the emulation circuit 30 is converted to an emulation current ICM through an impedance device (for example, a resistor R3). In addition, the operational circuit 40 is disposed between an impedance device (the resistor R1) and the amplification circuit 21. Thereby, the detection signal is converted to an input current IIN through the resistor R1. While operating, the operational circuit 40 subtracts the emulation current ICM from the input current IIN to generate the operational signal S40. Thereby, according to the embodiments in FIGS. 3 to 5, it is known that the operational signal S40 can be a voltage signal or a current signal.

Figure 6:
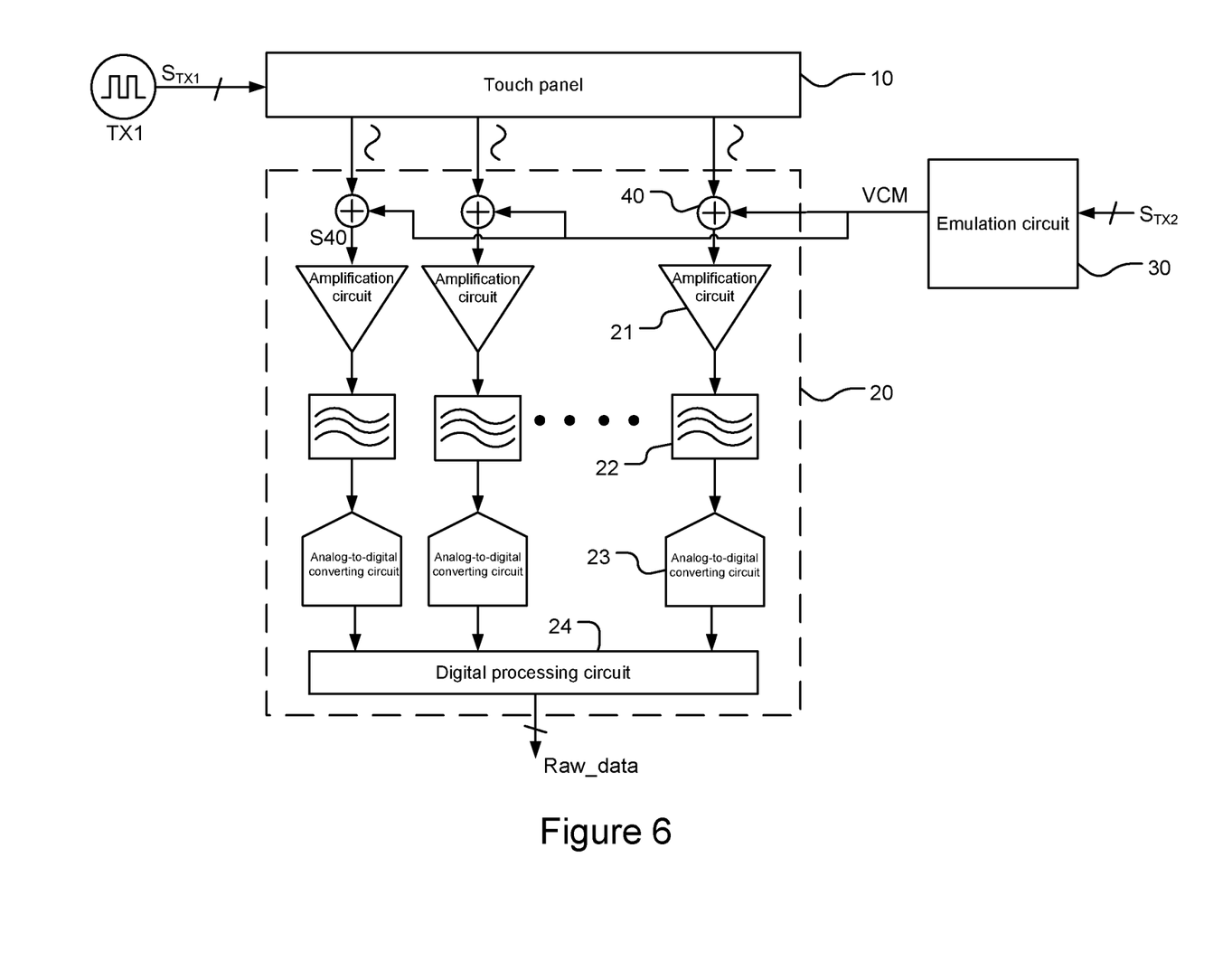
FIG. 6 shows a schematic diagram of the touch device according to a second embodiment of the present invention.

Please refer to FIG. 6, which shows a schematic diagram of the touch device according to a second embodiment of the present invention. As shown in the figure, the touch panel 10 of the touch device can be a mutual-capacitance panel. The signal STX1 is transmitted to the driving electrodes inside the touch panel 10. The driving electrodes can be an additional electrode. Alternatively, a common electrode can be adopted as the driving electrode for touch. Either way, all are the embodiment of the present invention. The rest technical content according to the embodiment in FIG. 6 is the same as the one in FIG. 2. Hence, the detailed will not be described again.

Figure 7:
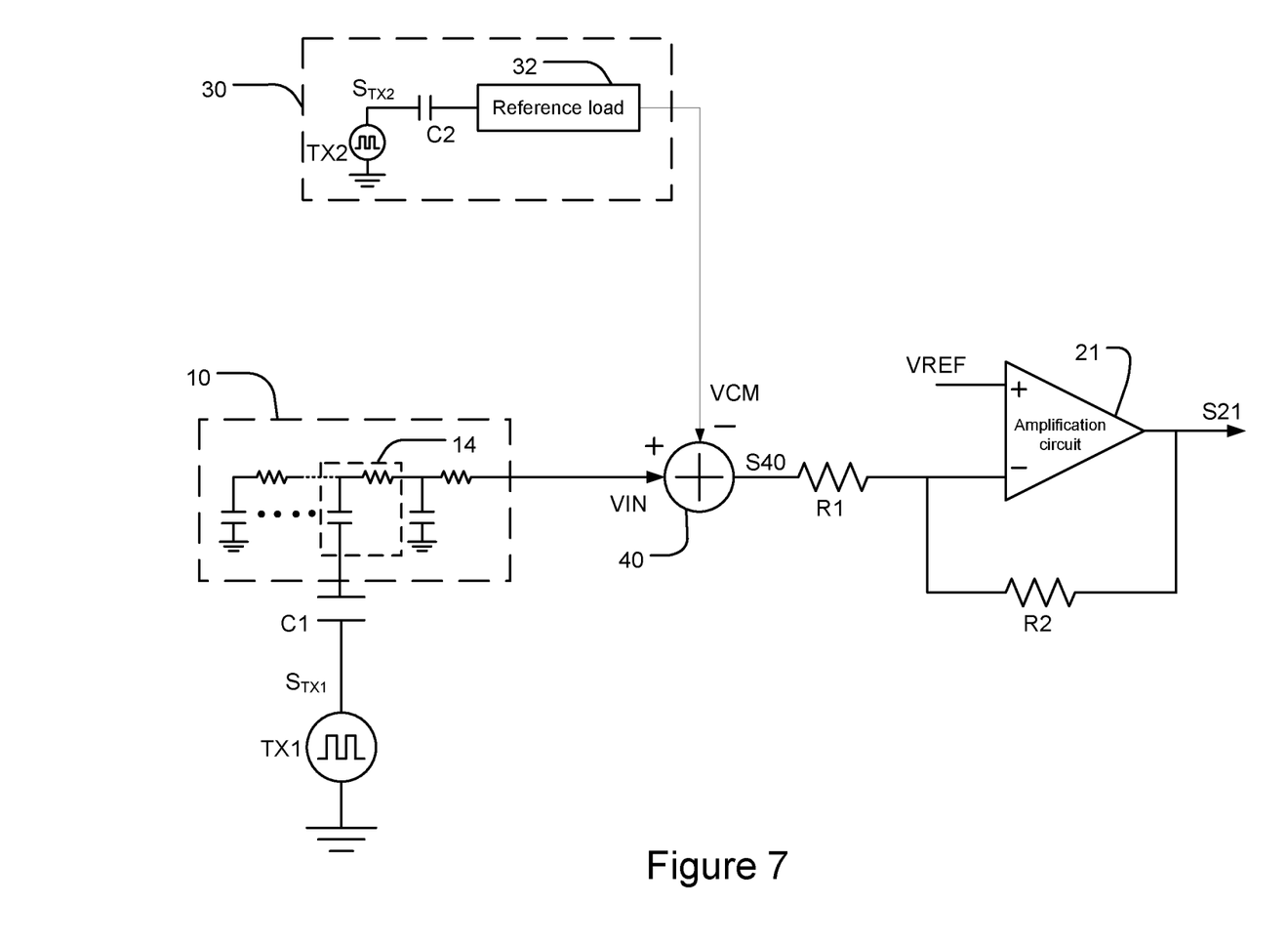
FIG. 7 shows a schematic diagram of the emulation circuit applied to the touch device according to the second embodiment of the present invention.

Please refer to FIG. 7, which shows a schematic diagram of the emulation circuit applied to the touch device according to the second embodiment of the present invention. As shown in the figure, the signal source TX1 generates the signal STX1 to the transmission device (the capacitor C1). The transmission device transmits the signal STX1 to the driving electrodes inside the touch panel 10. An equivalent load 14 formed by coupling between the driving electrode and the sensing electrode may comprise a capacitor and a resistor. Thereby, the reference load 32 in the emulation circuit 30 may match the equivalent loads in the touch panel 10. In addition, the operational circuit 40 in FIGS. 3, 4, and 7 receives the emulation signal VCM in a voltage form, while the operational circuit 40 in FIG. 5 receives the emulation current ICM in a current form. The locations of the emulation circuits 30 are not totally the same. In other words, the emulation circuit 30 according to the embodiments in FIGS. 3, 4, 5, and 7 can be applied to the touch device in FIGS. 2 and 6. The details will not be described again.

Figure 8:
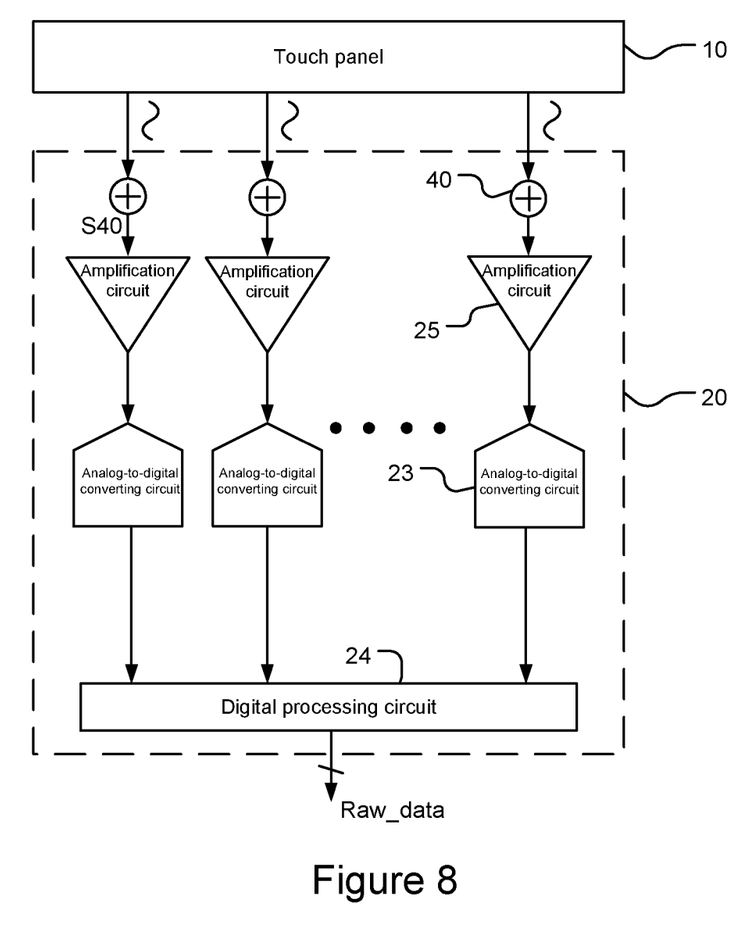
FIG. 8 shows a schematic diagram of the emulation circuit applied to the touch device according to the third embodiment of the present invention.
Figure 9:
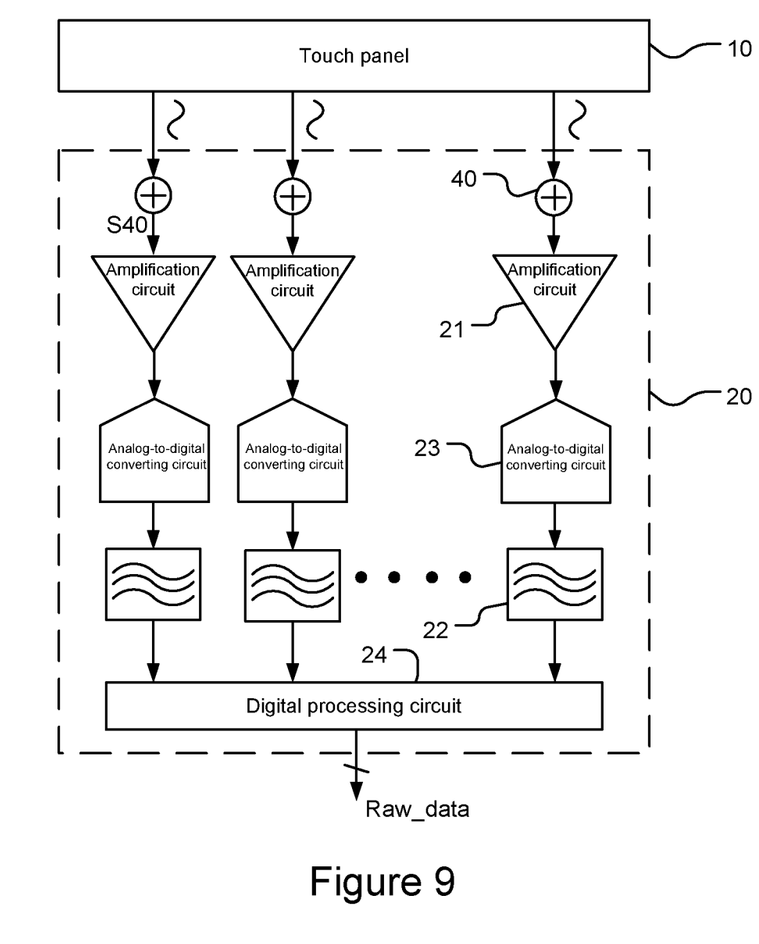
FIG. 9 shows a schematic diagram of the emulation circuit applied to the touch device according to the fourth embodiment of the present invention.

Furthermore, refer to FIG. 8, which shows a schematic diagram of the touch device according to a third embodiment of the present invention. FIG. 8 shows another embodiment of FIGS. 2 and 6, an amplification circuit 25 can include filtering functions. According to the embodiment, no filtering circuit 22 of FIGS. 2 and 6 is required. Moreover, refer to FIG. 9, which shows a schematic diagram of the touch device according to a fourth embodiment of the present invention. FIG. 9 shows further another embodiment of FIGS. 2 and 6, the amplification circuit 21 is coupled to the analog-to-digital converting circuit 23, the analog-to-digital converting circuit 23 is coupled to the filtering circuit 22.

To sum up, the present invention discloses a touch circuit, which comprises a detection circuit and an emulation circuit. The detection circuit detects a detection signal; the emulation circuit includes a reference load and receives a signal. The emulation circuit generates an emulation signal according to the reference load and the signal. The touch circuit outputs a touch signal according to the detection signal and the emulation signal.

The emulation circuit includes a transmission device, which is coupled to the reference load and transmits the signal to the reference load. The reference load corresponds to the load of a touch panel.

The detection circuit includes an operational circuit. The operational circuit is coupled to a touch panel and the emulation circuit and receives and operates the detection signal and the emulation signal to generate an operational signal. Alternatively, the operational circuit is coupled to the emulation circuit, and receives and operates the emulation signal and a reference signal to generate the operational signal. Alternatively, the operational circuit is coupled to a touch panel via an impedance device and to the emulation circuit for receiving the emulation signal. The operational circuit generates an operational signal according to the detection signal and the emulation signal.

What is claimed is:

1. A touch circuit, comprising:
   an emulation circuit, including a reference load, receiving an emulated input signal, and generating an emulation output signal according to said reference load and said emulated input signal; and
   a detection circuit, receiving a detection signal and said emulation output signal from respective transmission paths;
   whereby said detection signal is generated according to a touch driving signal, said touch driving signal is corresponding to said emulated input signal, said emulated input signal being independent of said touch driving signal and selectively adjustable, said touch circuit outputs a touch signal according to said detection signal and said emulation output signal.

2. The touch circuit of claim 1, wherein said emulation circuit includes a transmission device, coupled to said reference load, transmitting said signal to said reference load, and said reference load corresponding to a touch-panel load.

3. The touch circuit of claim 2, wherein a touch sensing region includes a plurality of driving electrodes and a plurality of sensing electrodes;
   and an equivalent load formed by coupling between one of said plurality of driving electrodes and one of said plurality of sensing electrodes is said touch- panel load.

4. The touch circuit of claim 2, wherein a touch sensing region includes a plurality of driving electrodes and a plurality of sensing electrodes;
   and an equivalent load formed by one of said plurality of driving electrodes or one of said plurality of sensing electrodes is said touch-panel load.

5. The touch circuit of claim 2, wherein a touch sensing region includes a plurality of driving electrodes and a plurality of sensing electrodes;
   and an equivalent load formed by said plurality of driving electrodes and said plurality of sensing electrodes is said touch-panel load.

6. The touch circuit of claim 1, wherein said detection circuit includes an operational circuit, coupled to a touch panel and said emulation circuit, and receiving and operating said detection signal and said emulation output signal to generate an operational signal.

7. The touch circuit of claim 6, wherein said detection circuit includes an amplification circuit, coupled to said operational circuit through an impedance device, receiving a reference signal, and generating an amplification signal according to said operational signal and said reference signal.

8. The touch circuit of claim 1, wherein said detection circuit includes an operational circuit, coupled to said emulation circuit, and receiving and operating said emulation output signal and a reference signal to generate an operational signal.

9. The touch circuit of claim 8, wherein said detection circuit includes an amplification circuit, coupled to said operational circuit for receiving said operational signal, and generating an amplification signal according to said operational signal and said detection signal.

10. The touch circuit of claim 1, wherein said detection circuit includes an operational circuit, coupled to a touch panel through an impedance device, couple to said emulation circuit for receiving said emulation output signal, and generating an operational signal according to said detection signal and said emulation output signal.

11. The touch circuit of claim 10, wherein said detection circuit includes an amplification circuit, coupled to said operational circuit for receiving said operational signal, coupled to a reference signal, and generating an amplification signal according to said operational signal and said reference signal.

* * * * *